CHEMICAL PROCESS

Alan J. Lemin, Kalamazoo, Mich., assignor to The Upjohn Company, Kalamazoo, Mich., a corporation of Michigan No Drawing. Application January 22, 1957
Serial No. 635,143

3 Claims. (Cl. 260—281)

This invention relates to a chemical process and more particularly to a process for preparing an isomer of cycloheximide.

Cycloheximide (3-[2-(3,5 - dimethyl-2-oxocyclohexyl)-2-hydroxyethyl]glutarimide) is an antibiotic that is produced by a culture of *Streptomyces griseus* when grown on a suitable nutrient medium. The active component can be isolated from a fermentative beer by the methods described in U.S. Patents 2,574,519 and 2,612,502; by Leach et al. in J. Am. Chem. Soc. 69, 474 (1947); and by Ford et al. in J. Am. Chem. Soc. 70, 1123 (1948). Its structural formula was proved by Kornfeld et al. [J. Am. Chem. Soc. 71, 150 (1949)]. Analytically pure cycloheximide has a melting point of 116–117 degrees centigrade (Kornfeld et al. report a slightly higher melting point) and its specific rotation $[\alpha]_D$ is —3.0 degrees (c.=10, methanol).

Cycloheximide is effective for the control of many plant diseases caused by fungi and is particularly effective for the control of cherry leaf spot, cereal grain rusts, bean anthracnose, apple scab, and Merion bluegrass rust. But cycloheximide itself is phytotoxic at higher rates of application; and most disadvantageously, it is not translocated in the plant tissues and consequently is ineffective in the control of disease fungi on new growth.

An isomer of cycloheximide has been isolated from the aged mother liquors from the recrystallization of cycloheximide. This isomer differs from cycloheximide in that it is much less phytotoxic and is translocated through the vascular system of plants to protect new growth against disease fungi. The isomer when substantially pure has a melting point at 101–102 degrees centigrade and specific rotation $[\alpha]_D = +36$ degrees (c.=10, methanol) and will be referred to hereinafter as isocycloheximide. It has been further differentiated from cycloheximide by its characteristic infrared absorption pattern, and lower toxicity to animals. It is therefore desirable to be able to convert cycloheximide to isocycloheximide.

An object of this invention is to provide a procedure for the isomerization of cycloheximide. Other objects of the invention will become apparent to persons skilled in the art as the following description proceeds.

These objects are accomplished by contacting a solution of cycloheximide in an organic solvent such as benzene, toluene, xylene, or carbon tetrachloride, with an acid-deactivated adsorbent alumina. After equilibration between cycloheximide and isocycloheximide is substantially reached, the isomeric mixture is eluted with a suitable eluant such as chloroform, ethyl acetate, methanol, chloroform-methanol mixture, and the like.

The mixture of isomers can be used after evaporation of the solvent, or the isocycloheximide can be separated and purified by appropriate methods such as: fractional recrystallization, countercurrent distribution, partition chromatography, separation of suitable derivatives, and the like.

Acid-deactivated adsorbent alumina can be prepared in the following manner: One hundred grams of an active (adsorbent) alumina such as Fisher Adsorption Alumina Brockman Grade I (80–200 mesh) is suspended in benzene, treated with from about five to about nine milliliters of from about seven to about thirteen percent, preferably about nine to about eleven percent, of aqueous acetic acid, and the mixture shaken for about three hours. After being kept overnight at room temperature, the acid-deactivated adsorbent alumina is ready for use.

After the isomerization process has been carried out, the eluants contain a mixture of cycloheximide and isocycloheximide. Their relative proportions can be estimated by reference to curves plotted from known mixtures; for example, specific rotation of a solution, e.g., a methanol solution, of the mixture, plotted against the percentage of isocycloheximide. Thus, when the specific rotation of the solids obtained from the eluate has been determined, the percentage of isocycloheximide can be read from such a curve. Similar reference curves can be obtained by plotting inhibition of *Saccharomyces pastorianus* against percentage of cycloheximide or isocycloheximide; isocycloheximide is about twenty percent as active against this organism as cycloheximide. This general bioassay method employed has been described by A. J. Whiffen in J. Bact. 56, 283 (1948).

By using a combination of such checks, it is possible to determine proportions of isocycloheximide to cycloheximide in the eluate. For example, the eluate of Example 1A gave 35 percent as effective inhibition of *S. pastorianus* as pure cycloheximide; this coupled with an $[\alpha]_D$ of +28 degrees indicates eighty percent isocycloheximide. The eluate of Example 1B gave 51 percent as effective inhibition of *S. pastorianus;* this coupled with an $[\alpha]_D$ of +twenty degrees indicates sixty percent isocycloheximide.

Purification by countercurrent distribution can be effected using benzene:water phases; but emulsions are troublesome and sometimes require centrifugation to effect separation of the phases. A more efficient separation can be effected using phases prepared by mixing benzene (ten parts), methanol (five parts), and water (one part), the parts being by volume.

The following examples are illustrative of the process and products of the present invention, but are not to be construed as limiting.

EXAMPLE 1

*Isomerization on a column*

A. The acid-deactivated adsorbent alumina, prepared as above, using 200 grams of Fisher Adsorption Alumina Brockman Grade I (80–200 mesh) 400 milliliters of dry benzene, and twelve milliliters of ten percent aqueous acetic acid, was stirred to a slurry and poured into a glass tube two centimeters in diameter and allowed to settle at atmospheric pressure until a column of adsorbent about 25 centimeters long had been formed. Then four grams of cycloheximide which had been dissolved in twenty milliliters of benzene was adsorbed thereon. After an interval of three hours at room temperature, the column was eluted with 400 milliliters of chloroform. The chloroform was evaporated leaving a mixture of cycloheximide and isocycloheximide which weighed 0.035 gram. It had a melting point of 82–92 degrees centigrade and specific rotation $[\alpha]_D = +28$ degrees (methanol). The material gave 92 percent in vivo control of *Alternaria solani*, and was 35 percent as active as pure cycloheximide in bioassay with *S. pastorianus*. Therefore, the mixture contained about eighty percent isocycloheximide.

*Analysis.*—Calc'd. for $C_{15}H_{23}NO_4$: C, 64.03; H, 8.24; N, 4.89. Found: C, 65.10; H, 7.98; N, 5.08.

B. A further elution of the column of Example 1A with 1.5 liters of chloroform and evaporation of solvent as above gave 0.8 gram of oily product which upon trituration with ether-ethyl acetate mixture became solid. The melting point of this crude product was 60–78 degrees centigrade and the specific rotation $[\alpha]_D$ was +twenty degrees (methanol). This preparation gave 51 percent inhibition of *S. pastorianus* which indicates about sixty percent of isocycloheximide.

Analysis.—Calc'd. for $C_{15}H_{23}NO_4$: C, 64.03; H, 8.24; N, 4.89. Found: C, 63.67; H, 8.37; N, 5.02.

EXAMPLE 2

*Isomerization in a suspension*

A. To a benzene suspension of 457 grams of alumina, deactivated as described, was added a solution of twenty grams of cycloheximide in 200 milliliters of benzene. The mixture was shaken continuously. After one hour, an aliquot of the slurry equivalent to about twenty grams of alumina was taken for analysis. Samples were similarly taken at two, three, four, five and one-half, and six and one-half hours. Each sample was filtered; the alumina, after being air-dried, was resuspended in fifty milliliters of chloroform for about ten minutes at room temperature and the mixture was filtered. The chloroform filtrates yielded oily mixtures of cycloheximide and isocycloheximide upon evaporation, and the oils were converted to solids by trituration with ether-ethyl acetate. The proportion of isocycloheximide present in each sample was determined by comparisons of specific rotation and bioassay against *S. pastorianus*. Table I shows the results.

TABLE I

| Time (hours) | Melting Point, Degrees Centigrade | Percentage Isocycloheximide |
|---|---|---|
| 1 | 84–90 | 0 |
| 2 | 87–98 | 35.5 |
| 3 | 88–96 | 65 |
| 4 | 86–92 | 65 |
| 5½ | 84–90 | 65 |
| 6½ | 77–84 | 65 |

B. After six and one-half hours the remainder of the alumina suspension was filtered; the alumina was air-dried and then resuspended in 700 milliliters of choloroform. This suspension was held at room temperature for about one-half hour and then filtered. The filtrate was evaporated leaving 4.65 grams of a cycloheximide-isocycloheximide mixture. After one crystallization from ether, the product had a melting point at 77–84 degrees centigrade and specific rotation $[\alpha]_D = +26$ degrees (methanol). This indicates about 71 percent of isocycloheximide. The bioassay gave cycloheximide activity of about forty percent (indicating sixty percent of isocycloheximide). This preparation gave 82 percent in vivo control of *A. solani*.

EXAMPLE 3

*Countercurrent separation of isocycloheximide*

A mixture of benzene (ten parts), methanol (five parts), and water (one part), the parts being by volume, was allowed to equilibrate into two phases. Portions of each phase were then taken for the two-phase distribution system. After 2.75 grams of the alumina-isomerized mixture of Example 2B had been added, the benzene layer was used as the traveling phase. The resultant fractions 1 through 10 contained products as shown in Table II.

TABLE II

| Fraction No. | | Melting Point (Degrees Centigrade) |
|---|---|---|
| 1 | 20 mg. oil | |
| 2 | trace of oil | |
| 3 | do | |
| 4 | 20 mg. of oil | |
| 5 | 160 mg. after trituration with ether-ethyl acetate. | 89–98 partially, 105–114 completely. |
| 6 | 200 mg. after trituration with ether-ethyl acetate. | 68–71 partially, 81–99 completely. |
| 7 | 490 mg. after trituration with ether-ethyl acetate. | 83–90. |
| 8 | 620 mg. after trituration with ether-ethyl acetate. | 87–93. |
| 9 | 600 mg. of oil | |
| 10 | 140 mg. of oil | |

Fraction 8, after recrystallization from ether-ethyl acetate, gave an infrared adsorption spectrum identical with known isocycloheximide and a mixture melting point was not depressed. Fraction 7 was also identified as isocycloheximide.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the preparation of isocycloheximide which comprises adsorbing cycloheximide on alumina deactivated and neutralized with five to nine percent (weight:volume) of seven to thirteen percent aqueous acetic acid from a solution thereof in an inert solvent and eluting a mixture of isocycloheximide and cycloheximide therefrom.

2. A process for the preparation of isocycloheximide which comprises contacting a solution of cycloheximide in an inert solvent with adsorbent alumina deactivated and neutralized with five to nine percent (weight:volume) of nine to eleven percent aqueous acetic acid and recovering therefrom with chloroform a mixture of isocycloheximide and cycloheximide.

3. A process for the preparation of isocycloheximide which comprises adsorbing cycloheximide from benzene on alumina deactivated and neutralized with five to nine percent (weight:volume) of nine to eleven percent aqueous acetic acid and eluting therefrom with chloroform a mixture of isocycloheximide and cycloheximide.

References Cited in the file of this patent

UNITED STATES PATENTS

| 2,574,519 | Whiffen et al. | Nov. 13, 1951 |
| 2,612,502 | Leach | Sept. 30, 1952 |

OTHER REFERENCES

Lange: Handbook of Chemistry, ninth ed., Handbook Publ. Co., Inc., Ohio, 1956, p. 204.